(12) United States Patent
Butera et al.

(10) Patent No.: US 8,262,443 B2
(45) Date of Patent: Sep. 11, 2012

(54) AIR DISTRIBUTION SYSTEM WITH CONTACTLESS ACTIVATION OF AIR OPENINGS

(75) Inventors: Francesco Butera, Turin (IT); Marco Biasiotto, Turin (IT); Andrea Perosino, Orbassano (Turin) (IT); Alessandro Zanella, Turin (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 1365 days.

(21) Appl. No.: 11/271,924

(22) Filed: Nov. 14, 2005

(65) Prior Publication Data
US 2006/0105698 A1 May 18, 2006

(30) Foreign Application Priority Data
Nov. 18, 2004 (EP) .................................. 04425861

(51) Int. Cl.
B61D 27/00 (2006.01)
B60H 1/03 (2006.01)
B60H 1/32 (2006.01)
B60H 1/00 (2006.01)

(52) U.S. Cl. ........... 454/75; 237/12.3 R; 62/244; 165/41

(58) Field of Classification Search ............ 454/75, 454/155
See application file for complete search history.

(56) References Cited

U.S. PATENT DOCUMENTS
6,386,965 B1 * 5/2002 Greenwald et al. ............ 454/75
6,837,786 B2 * 1/2005 Linde et al. .................... 454/256
2002/0019213 A1 2/2002 Yoshinori et al.

FOREIGN PATENT DOCUMENTS
DE 101 03 486 8/2002
FR 2 833 387 6/2003
JP 2002100268 A * 4/2002
JP 2004122802 A * 4/2004

OTHER PUBLICATIONS

Ennglish translatin of abstract and document.*
Abstract translation of JP 2002 100268 A.*
English mashine translation of JP 2004-122802A document.*

* cited by examiner

*Primary Examiner* — Steven B McAllister
*Assistant Examiner* — Helena Kosanovic
(74) *Attorney, Agent, or Firm* — Nixon & Vanderhye P.C.

(57) ABSTRACT

A system for distributing air in the passenger compartment of a vehicle, e.g. of a motor vehicle, comprises at least one outlet for the outflow of air in the passenger compartment which can be activated placing a hand at a short distance therefrom without touching it.

5 Claims, 2 Drawing Sheets

AIR DISTRIBUTION SYSTEM WITH CONTACTLESS ACTIVATION OF AIR OPENINGS

BACKGROUND OF THE INVENTION

The present invention relates to air distribution systems, in particular in the passenger compartment of a vehicle, e.g. of a motor vehicle, of the type comprising at least one opening or outlet for the outflow of air into the passenger compartment, one conduit for feeding a flow of air to said outlet, and means for activating the air outlet, i.e. for commanding the opening of the outlet and/or for enabling the feeding of the aforesaid flow of air to the outlet through said conduit.

SUMMARY OF THE INVENTION

The object of the present invention is to provide a system of the type specified above which is simple and economical yet efficient in operation, as well as convenient to use.

In view of achieving said object, the subject of the invention is an air distribution system of the type indicated above, characterised in that the aforesaid means for activating the outlet include a proximity or presence sensor positioned adjacent to said outlet, able to output an electrical signal to activate the outlet as a result of the detection of the presence of a body at a short distance from the outlet, in such a way that the outlet can be activated e.g. placing a hand in front of it, without touching it.

The aforesaid proximity sensor can be constituted in any known fashion, and can be for example an optical or ultrasound sensor. The signal output by the sensor is sent to an electronic control unit which causes the activation of the outlet, e.g. commanding the activation of an actuator which commands the opening of the outlet, or of a movable member for controlling the flow of the distribution system, which enables the feeding of a flow of air to the aforesaid conduit for feeding air to the outlet.

BRIEF DESCRIPTION OF THE DRAWINGS

The present invention shall now be described with reference to the accompanying drawings, provided purely by way of non limiting example, in which.

DETAILED DESCRIPTION OF THE INVENTION

Figure 1:
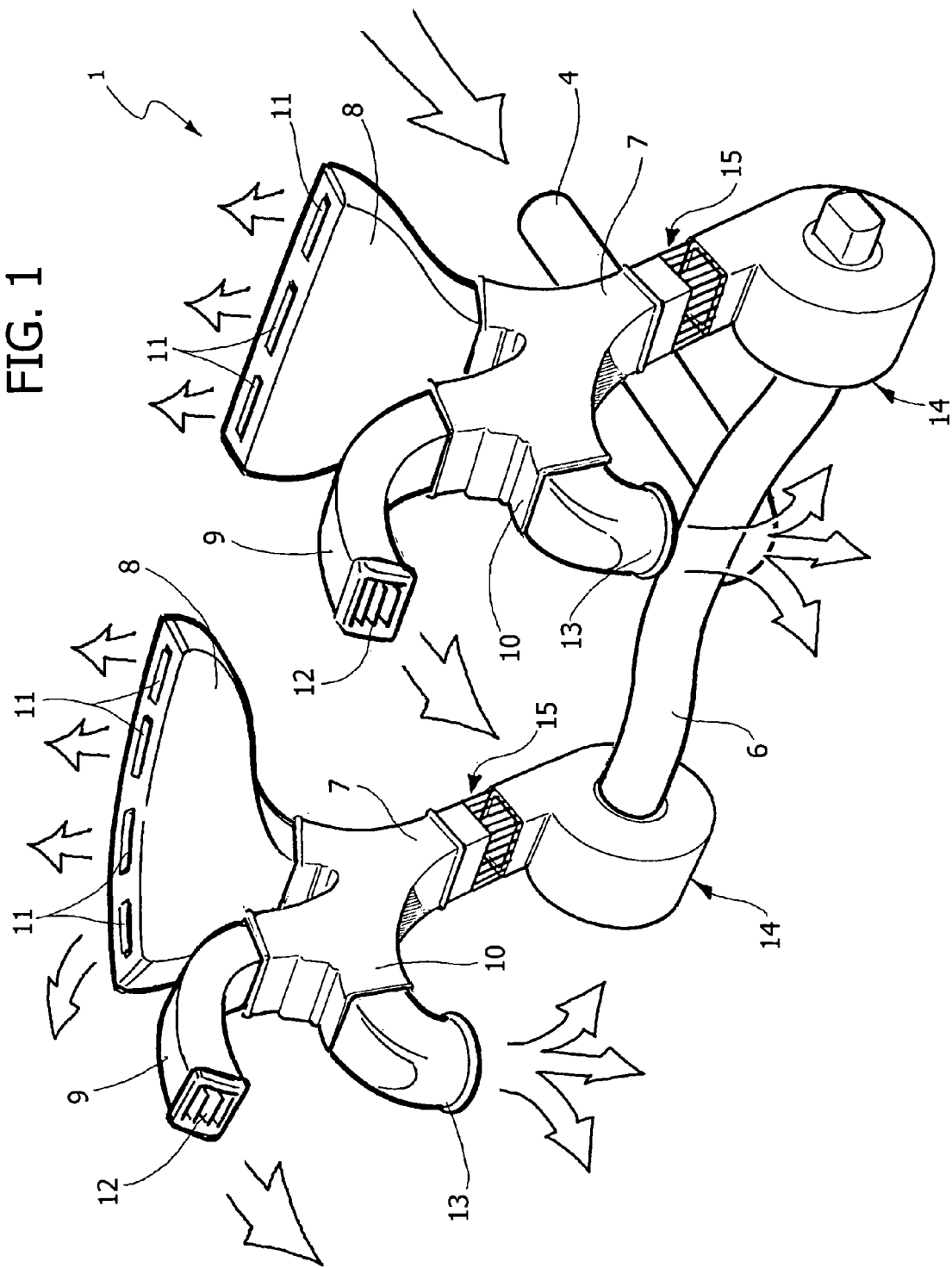
FIG. 1 is a perspective schematic view of a system for distributing air in the passenger compartment of a motor vehicle according to the present invention.

The air distribution system shown in FIG. 1 is of the type that formed the subject of the prior Italian patent application TO2003A001008 filed by the same Applicant and still secret as of the date of filing of the present application. However, it should be noted that the present invention has general application and therefore it can be used in any system for distributing air to the passenger compartment of a motor vehicle and also in the field of vehicles in general. A system of the type described above can also be used for example to control the air outlets to the passenger compartment of an aircraft or of a boat or a home or building in general.

In the drawings, the number 1 globally designates an air distribution system associated with the dashboard 2 (shown only partially in FIG. 2) of a motor car. The distribution system 1 comprise a main conduit 4 that receives air from an air conditioning system, including a main fan (not shown) and a heater/evaporator (not shown). The main conduit 4 ends in a manifold or rail 6 wherefrom branch 4 auxiliary conduits 7 (only two of which are shown in FIG. 1) distributed in parallel along the dashboard, one pair on the driver's side, and one pair on the passenger's side, each pair comprising a conduit adjacent to the central part of the dashboard and a conduit that is closer to a lateral window of the motor vehicle. Each auxiliary conduit 7 branches into three terminal conduits 8, 9, 10 each of which ends on air outlets for the outflow of air into the passenger compartment of a motor vehicle. In particular, the conduit 8 feed outlets 11 positioned at the base of the windshield to address the flow of air on the inner surface thereof. The conduit 9 ends on one or more outlets 12 positioned frontally on the dashboard to address air towards the passenger compartment of the motor vehicle, and the conduit 10 ends in one or more outlets 13 which direct a flow of air towards the floor of the passenger compartment.

In the region in which each auxiliary conduit 7 branches into the three terminal conduits 8, 9, 10 are positioned means for distributing the air flow between the terminal conduits. Such means can be constituted, in known fashion, by flow deviating ports (not shown) or, according to a technology developed by the same Applicant and constituting the subject of various prior patents, can be constituted by elements able to determine the deviation of the flow by Coanda effect. A solution of this kind is, for example, described and illustrated in the international patent application WO2004/065149 by the same Applicant.

In the specific case of the system illustrated in FIG. 1, in accordance with the teachings of the prior Italian application identified above, each of the auxiliary conduits 7 is provided with an additional and independent unit for the regulation of at least one characteristic of the flow of air. In particular, to each auxiliary conduit 7 is associated, in the illustrated embodiment, a unit 14 for regulating the air flow rate, and a unit 15 for regulating air temperature. The unit 14 comprises a fan with related electric actuation motor, whilst the unit 15 comprises a conduit section into which is inserted an electrical resistor. However, as set out above, this specific embodiment is provided herein purely by way of example, as it is readily apparent that the teachings of the present invention are applicable to any type of air distribution system, provided it is equipped with one or more air outlet for the outflow of air into the passenger compartment of the vehicle which can be activated bringing them to an open condition and/or enabling the feeding of a flow of air through the conduit which feeds them.

Returning to the specific illustrated example, the distribution system 1 allows to regulate the flow rate and/or the temperature of the air flow out of the outlets 11, 12, 13, separately for each of the auxiliary conduits 7, i.e., again in the case of the illustrated example, separately for the driver zone and for the passenger zone and, for each of said zones, separately for the central zone of the dashboard and for the zone adjacent to the window.

Figure 2:
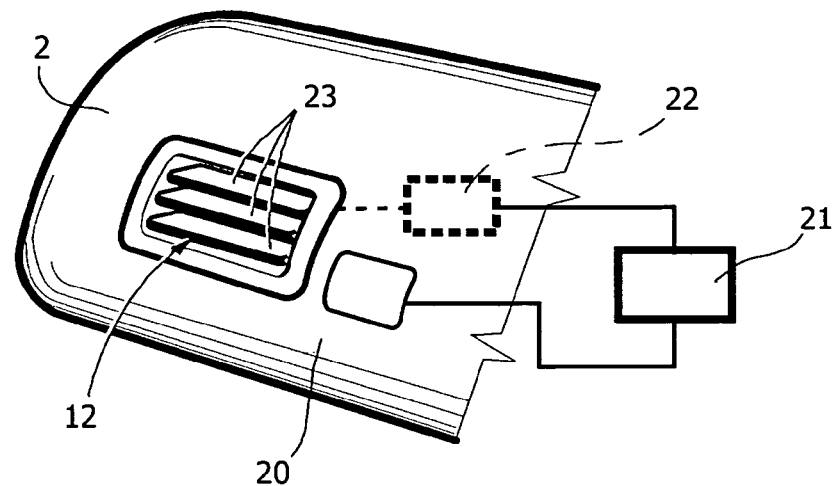
FIG. 2 is a partial schematic perspective view, in enlarged scale, of the dashboard of the motor vehicle using the system of FIG. 1.

FIG. 2 shows in enlarged scale one of the outlets 12 shown in FIG. 1. According to the invention, on the dashboard 2, adjacent to the outlet 12, is provided a proximity sensor 20, able to output an electric signal indicating the presence of a body positioned at a short distance from the outlet 12. The electrical signal output by the sensor 10 is sent to an electronic control unit 21 which consequently controls an actuator 22 (shown schematically in FIG. 2) which commands the displacement of a plurality of oscillating tabs 23 positioned, in known fashion, in correspondence with the outlet 12, to a condition of maximum opening of the outlet.

The construction details of the actuator 22, of the mechanical transmission that connects the actuator 22 to the tabs 23, and to the proximity sensor 20 are not shown herein, because said elements can be obtained in any known manner. For example, the proximity sensor can be of the optical or ultrasound type. The actuator 22 can be an electric motor which actuates the motion of the tabs 23 by means of a rack and pinion mechanism.

Thanks to the described arrangement, the activation of the outlet 12, i.e. its shift to the open condition, can be obtained for example by simply placing the hand in front of the outlet, without touching it. In this condition, the sensor 20 will detect the presence of the user's hand and will consequently activate the opening of the outlet.

Naturally, in the case of the subsequent activation of the sensor, the sensor itself emits a signal that is used to bring the outlet back to the closed condition. In other words, each subsequent activation of the sensor causes the consecutive move of the outlet 12 from the open condition to the closed condition and vice versa.

Figure 3:
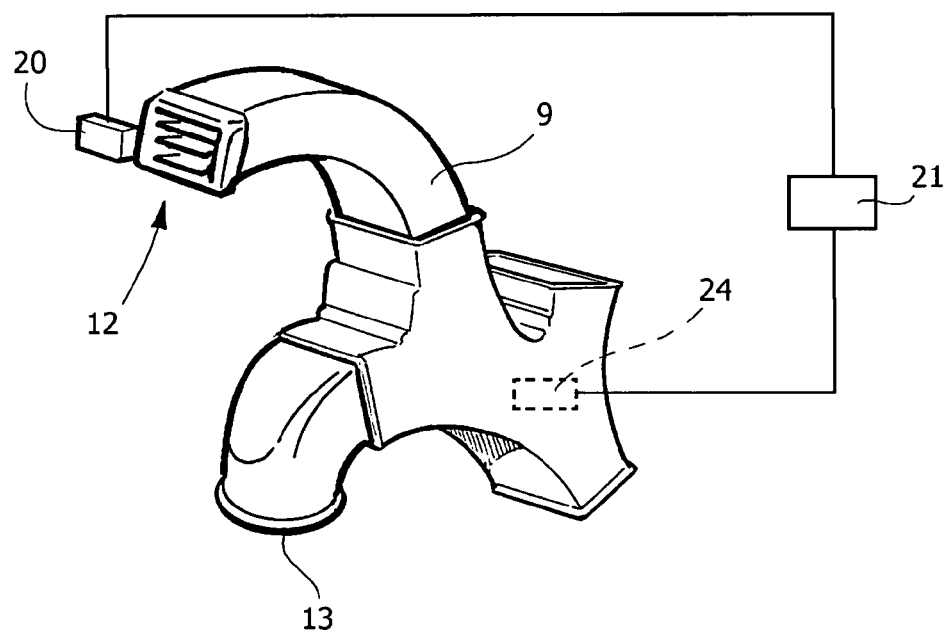
FIG. 3 shows a detail of FIG. 1 with reference to an alternative solution, also in accordance with the invention.

FIG. 3 shows a variant in which the outlet 12 always remains in the open condition and the signal output by the proximity sensor 20 is used to activate actuator means 24 of any type, suitable to enable the feeding of air through the conduit 9 which ends in the outlet 12. In this case, too, each subsequent activation of the sensor 20 determines successively to enable and disable the feeding of air through the conduit 9.

In this case the opening or the closing of the outlet are immediate: the sensor directly controls the central distribution of the climate system acting directly on the channel, in particular deviating the flow among the various distribution channels. Vice versa, in the traditional system the command of the outlet, through the opening or closing of ports or tabs, must be coupled to the distribution command of the air conditioning set which must deviate the air to the channel corresponding to the outlet itself. This entails an actuation delay between the signal of the sensor and the outflow of air from the outlet in addition to a complication of the system at the electronic and mechanical level and an increase in costs.

Naturally, the same concept can also be applied to the outlets 11 or 13 of the air distribution system.

As stated above, the invention is nonetheless applicable to any type of air distribution system in any type of vehicle, including aircraft or boats, or in buildings in general. Obviously, the actuator means which activate the outlet as a result of the emission by the sensor 20 of a presence detection signal can be of any type.

Naturally, without altering the principles of the invention, the construction components and the embodiments may be widely varied from what is described and illustrated herein, without thereby departing from the scope of the invention.

What is claimed is:

1. An air distribution system in the passenger compartment of a vehicle comprising at least one outlet for the outflow of air into the passenger compartment, one conduit for feeding a flow of air to said outlet, and means for activating the outlet, that is, for commanding the opening of said outlet and/or for enabling the feeding of a flow of air to the outlet through said conduit, wherein the aforesaid activating means include a proximity sensor positioned adjacent to said outlet and able to output an electrical signal to activate the outlet as a result of the detection of the presence of a hand at a short distance from the outlet, wherein said activating means further comprises:
an actuator that causes said outlet to be brought:
(1) from an activated condition to a deactivated condition, and
(2) from the deactivated condition to the activated condition, and
an electronic control unit for receiving the signal emitted from said sensor and controlling said actuator, so that when the outlet is in an initial open position, the sensor actuates the outlet from the initial open position to a closed position whenever a hand is placed in front of the sensor without touching the sensor, and when the outlet is in an initial closed position, the sensor actuates the outlet from the initial closed position to an open position whenever a hand is placed in front of the sensor without touching the sensor, and wherein said actuator drives the movement of a plurality of oscillating tabs or other mechanical closure means associated to the outlet between the closed position and the open position of the outlet.

2. A system as claimed in claim 1, wherein the proximity sensor is of the type chosen among optical sensors and ultrasound or infrared sensors.

3. A system as claimed in claim 1, wherein said actuator is able to deviate in the aforesaid feed conduit a flow of air coming from a source of conditioned air.

4. A motor vehicle dashboard provided with an air distribution system as claimed in claim 1.

5. An aircraft having a passenger cabin and a system for distributing air to the passenger cabin as claimed in claim 1.

* * * * *